United States Patent [19]
Jaccard

[11] Patent Number: 6,135,873
[45] Date of Patent: Oct. 24, 2000

[54] POSITIVE LOCKING SYSTEM FOR RETROFITTING MEAT TENDERIZING MACHINES

[75] Inventor: Andre R. Jaccard, Holland, N.Y.

[73] Assignee: Jaccard Corporation, Orchard Park, N.Y.

[21] Appl. No.: 09/391,813

[22] Filed: Sep. 8, 1999

[51] Int. Cl.[7] .................................................. A22C 9/00
[52] U.S. Cl. .................. 452/141; 411/221; 411/340; 411/345
[58] Field of Search .............................. 452/141; 411/90, 411/91, 221, 340, 345, 988

[56] References Cited

U.S. PATENT DOCUMENTS

| 266,180 | 10/1882 | Miller . | |
|---|---|---|---|
| 483,921 | 10/1892 | Hibbs . | |
| 1,370,216 | 3/1921 | Lester et al. . | |
| 3,283,360 | 11/1966 | Tamain | 452/141 |
| 3,577,585 | 5/1971 | Allinquant | 452/141 |

FOREIGN PATENT DOCUMENTS

| 1018795 | 1/1953 | France | 452/141 |
|---|---|---|---|

*Primary Examiner*—Willis Little
*Attorney, Agent, or Firm*—James J. Ralabate

[57] ABSTRACT

This invention involves a locking mechanism that prevents the blade assembly of a mechanical meat tenderizer from becoming worn or non-functional. The locking mechanism is easily retrofitted into machines having blade assemblies and stripper frames and is a simple bar that mates with a slot in a screw nut.

14 Claims, 2 Drawing Sheets

POSITIVE LOCKING SYSTEM FOR RETROFITTING MEAT TENDERIZING MACHINES

This invention relates to a locking mechanism for a meat tenderizing machine and, more specifically, to a locking mechanism to prevent machine components from loosening and wearing.

BACKGROUND OF THE INVENTION

It is known in the art to use various hand-operated and power-driven machines that are used by butchers and meat-packing houses to mechanically tenderize various types of meat, fish and poultry. These machines comprise a plurality of blade segments that are aligned at selected distances for penetration into the meat. These blades cut the tendons or connective tissues in the meat with very fine incisions and thereby tenderize the meat. The blade segments are movably connected to a handle means which, when pulled down, will lower the blades into the meat section positioned below the blades. The blade assembly is connected to spring means, which easily allow the downward and return upward movement of the blade assembly after the tenderizing step. Some of these type machines are those disclosed in U.S. Pat. Nos. 3,283,360; 3,583,025; 5,085,614; 5,342,235 and 5,525,102.

In U.S. Pat. No. 3,283,360 (Tamain), a tenderizer is disclosed utilizing an assembly of close metal blades that are driven by an electric motor. The reciprocating movement of the blades driven by the motor forces them into the meat and withdraws them automatically. When the blade grid or assembly of blades is in position they are surrounded by a frame 35 which in turn is supported by two rods 36. All four sides of blades or cutting assembly 22 are surrounded by the frame 35. Thus, the frame 35 of Tamain must be kept level to prevent wear and/or breakage of the tenderizer when in constant use.

In Jaccard, U.S. Pat. No. 3,583,025, (hereinafter "Jaccard I"), a similar blade assembly 42 made up of blades 44 is used. This assembly also is completely surrounded by a frame or stripper plate 46 which, as in Tamain, requires means to hold the blade assembly level to prevent kiltering of the assembly and eventual wear or breakage. While the Jaccard tenderizer has been very successful, one serious drawback has been to keep the blade assembly level when in use. The adjustable screw nuts that hold the vertical columns in place can easily loosen and cause the columns to move thereby allowing the blade assembly to hit the meat unevenly. Each of the stripper plates or assemblies 46 of Jaccard are connected to two columns that are held in parallel alignment by screw nuts located at the upper section of the blade assembly frame.

In Bourret, U.S. Pat. No. 5,085,614, the same or similar stripper plate 46 as used by Jaccard and Tamain is shown. In front view FIG. 1 and side view FIG. 2, Bourret shows that his stripper plate completely surrounds the array of blades or blade assembly 12. In FIG. 2 of Bourret, his separator is shown (unnumbered) having an extending handle just over his element 17. The unnumbered separator is attached on grid 17 at both the front and the back. Means must also be used in Bourret to keep the stripper plate even to prevent wear.

In Watanabe, U.S. Pat. No. 5,342,235, an automatic meat tenderizer is shown but is quite dissimilar to the Jaccard or Bourret devices. Watanabe, however, also completely encloses his blades or needles by connecting members 29.

In Jaccard, U.S. Pat. No. 5,525,102 ("Jaccard II"), a blade assembly unit for use with a mechanical meat tenderizer is disclosed which has a novel stripper frame assembly 15. The type of mechanical meat tenderizer in Jaccard II is the same type of tenderizer used in the present invention except the present invention provides for a greatly improved performance and longevity of the stripper frame. By providing a novel locking mechanism, the present invention ensures an even contact of the stripper frame with the meat.

In all of the above-discussed prior art, the mechanisms that hold the stripper frames in place and prevent lateral movement are not as secure as they need to be. Often, the prior art adjustable screw nuts that hold the peripheral sections or columns of the blade assembly in place will become loose thereby causing severe wear problems. When the adjustable screw nuts are allowed to turn it causes one side of the stripper frame assembly to be either higher or lower than the other side (as shown in FIG. 2). This will make the stripper frame assembly cock and jam up the tenderizing machine. When the screw nuts turn or loosen, it will eventually break the stripper frame assembly.

SUMMARY OF THE INVENTION

It is therefore an object of this invention to provide a mechanical meat tenderizer devoid of the above-noted disadvantages.

Another object of this invention is to provide a locking means, which prevents or at least greatly minimizes wear and breakage of the blade assemblies of mechanical meat tenderizers.

Still a further object of this invention is to provide a locking means, which prevents the adjustable screw on typical meat tenderizers from moving.

Yet a further object of this invention is to provide a longer lasting more efficient mechanical meat tenderizer by improving the function of the components therein.

Another still further object of this invention is to provide a means for the stripper frame and blades of a mechanical tenderizer to always contact the meat in a substantial level manner.

These and other objects of this invention are accomplished, generally speaking, by a locking mechanism that fits into an adjusting screw nut that holds a stripper frame support column in place and prevents it from moving, thereby keeping the stripper frame assembly even when in use. If the stripper frame and blade assembly hit the meat unevenly constantly when being used, eventually the stripper frame assembly will break.

The Jaccard machine is the leader in mechanical meat tenderizing machines; it has been found that some of the Jaccard machines have been returned for repair or replacement of the stripper frame due to the uneven up and down motions of the stripper frame. In most instances, the stripper frame that was broken became inoperable because the connecting nuts loosen and the mechanism that caused the stripper frame to evenly contact the meat being tenderized wore down and eventually broke. The connecting adjustable screw nut that holds the two vertical columns (attached to the stripper frame) in place loosens and moves during use and causes the stripper frame to unevenly contact the meat. The vertical columns must be maintained in a substantially parallel position with each other in order that the stripper be held horizontally even on both sides. The prior art means that holds the screw nuts in position are easily moved and they become lose and move thereby allowing the stripper frame to become horizontally uneven. In order to correct this defect in the Jaccard machines (or other similar tenderizers, including electric and automatic) a solution needed to be found that would allow retrofitting of all of the machines before they broke down. A simple but very effective means was used to replace prior used locks with a secure locking mechanism that fits into a groove in the screw nut and prevents it from any movement.

The components of the stripper frame assembly can be made of any suitable material that is acceptable for food contact.

DESCRIPTION OF THE DRAWINGS AND PREFERRED EMBODIMENTS

Figure 1:
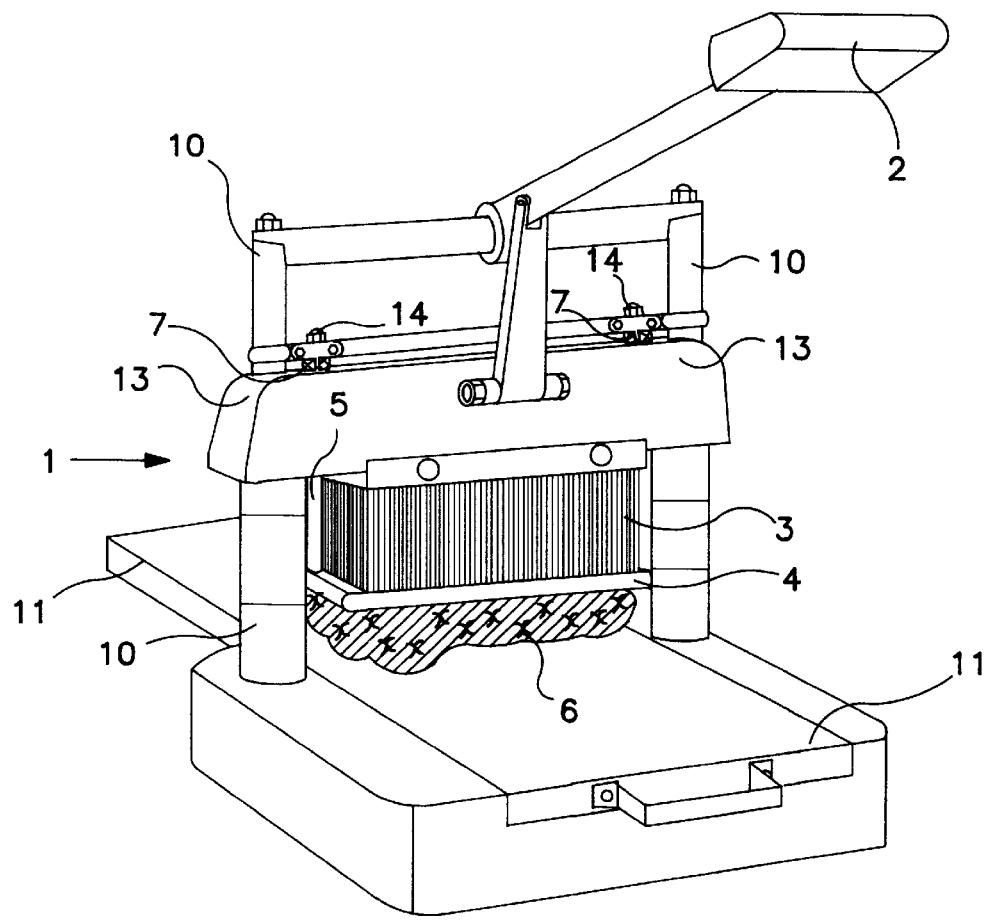
FIG. 1 is a perspective view of a typical mechanical meat tenderizer in which the stripper frame assembly of this invention is used.

In FIG. 1 a Jaccard tenderizer 1 Model H is illustrated having a handle 2 which when pulled down lowers the blade assembly 3 and blade guide or stripper frame assembly 4. The stripper frame 4 is horizontal and suspended from columns 5 which keep the stripper frame 4 even horizontally so that the stripper frame 4 and blade assembly 3 always evenly contact the meat 6 on the same plane throughout the surface of the stripper frame 4. The columns 5 are held in place by adjustable screw nuts 7 so that the columns 5 are always perpendicular to stripper frame 4 and contact blade guide or stripper frame 4 at a right angle. When screw nuts 7 loosen, columns 5 are not held perpendicular to stripper frame 4 and causes the stripper frame 4 to be higher or lower at each of its terminal portions. This will cause the stripper frame assembly 4 to cock and jam up the machine. It will eventually cause the stripper frame 4 to break and need replacement. The device used in the prior art to keep screw nuts 7 from moving have not been successful. When the prior art means become worn, screw nuts 7 will move and cause severe problems. Spring loaded telescoping cylinders 10 allow the blade assembly 3 and stripper frame 4 to move upward or downward when pressure is exerted upon handle 2. A clear description of how this functions is given in U.S. Pat. No. 5,525,102. The meat 6 is placed on a sliding board 11, which supports the meat 6 to be tenderized. The T-bar 15 of this invention has a prong or tail 17 which fits into a slot 12 located in screw nuts 7 and prevents screw nuts 7 from any movement. Upon constant and heavy use, it has been found that prior art means easily break or bend thereby causing screw nuts 7 to move; thus eventually causing the breaking of stripper frame 4.

Figure 2:
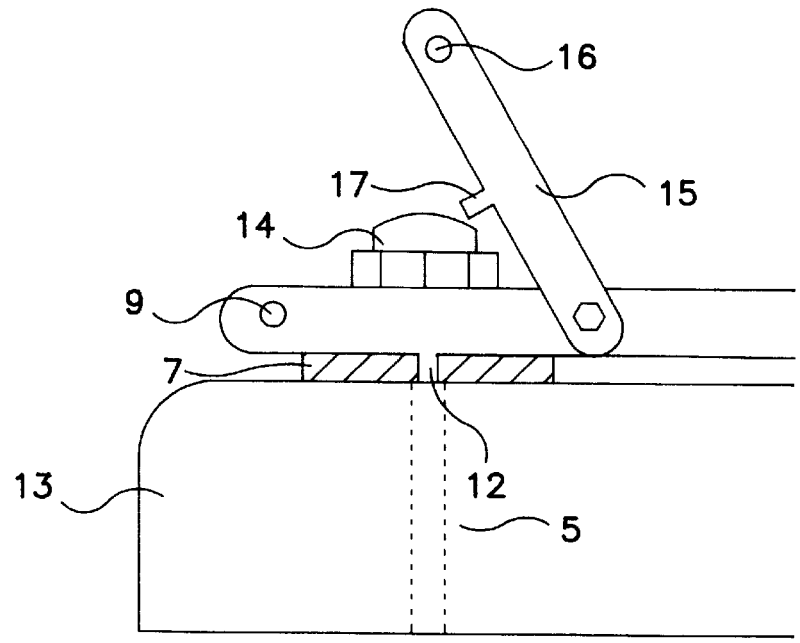
FIG. 2 is an enlarged plan front view of the locking mechanism and stripper frame of this invention when the T-shaped locking bar is not in locked position.
Figure 3:
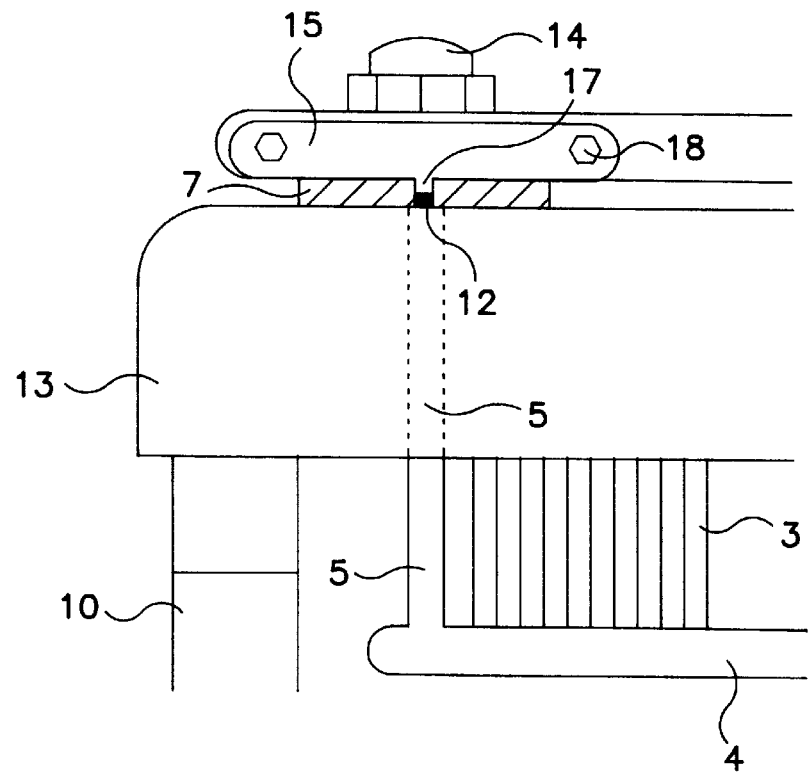
FIG. 3 is an enlarged plan front view of the locking mechanism, T-shaped bar and screw nut of this invention when the T-shaped locking bar is in a locked position.

In FIGS. 2 and 3, the upper boat structure 13 is cut away to clearly illustrate how columns 5 are connected to movable screw nuts 7 and top connecting nut 14. In FIG. 2, the present T-bar 15 locking mechanism is shown in an unlocked mode. Screw nuts 7 hold columns 5 perfectly vertical since the slot 12 in screw nuts 7 mate with the prong or tail 17 to hold screw nuts 7 and columns 5 in perfect fixed position. Any loosening of screws 7 causes uneven contact of stripper frame 4 with meat 6 and eventual breaking of stripper frame 4. In FIG. 3 the present T-bar 15 and prong 17 is shown locked in slot 12 when this present locking system is used. Because of the extreme amount of pressure exerted upon bar 15 and prong 17 in extended usage, a strong metal or other suitably strong material for T-bar 15 is used. In the prior art locking systems often machines are returned to the manufacturer to repair not only the locking mechanism but also usually to replace the stripper frame 4. A way to retrofit not only returned machines but also newly manufactured machines with a corrective but yet simple locking mechanism was seriously required; the present invention provides this.

Figure 4:
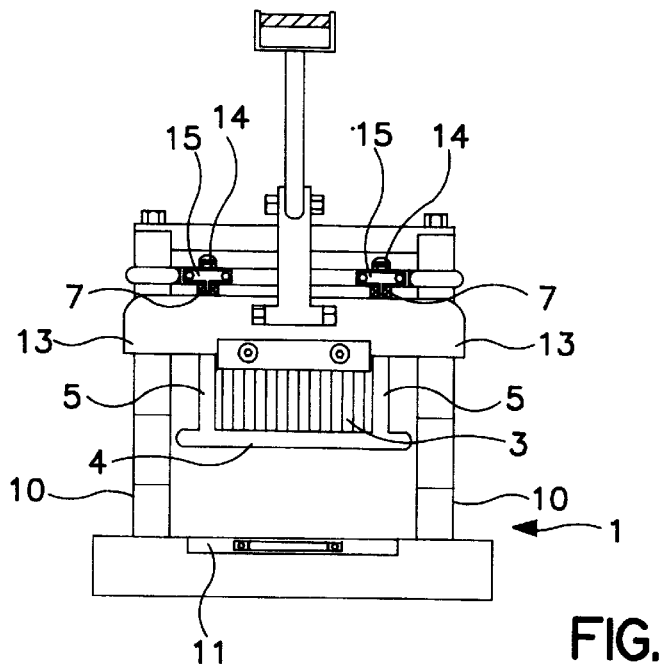
FIG. 4 is a plan front view of the meat tenderizer machine of FIG. 1 as used in the present invention in a mode where the T-shaped bar is in a locked position.

FIGS. 2, 3 and 4 show the novel improved locking mechanism that has totally solved this problem. A T-shaped safety lock or bar 15 is shown which is simple, can be easily retrofitted and is very effective in preventing movement of the screw nuts 7. The T-shaped bar or lock 15 has a horizontal bar with screw apertures 16 on both terminal ends of the bar which fit into mating holes 9. Projecting downward from the bar is a tail 17 which fits snuggly into screw slot 12 thereby very securely locking screw nuts 7 in position permanently. More than one tail 17 may be used if desired. Also, more than one slot 12 may be used if desirable. Screws or other securing means 18 are put into apertures 9 and 16 to firmly hold T-shaped safety lock permanently in position. FIGS. 3 and 4 show the T-shaped safety lock in a fully locked mode. In this manner screw nuts 7 are immovable and thereby damage to the stripper frame 5 has been completely prevented with the present invention.

By "horizontal" is meant throughout this disclosure and claims as a piece parallel to a flat table surface or parallel to the earth or a piece at right angles to a perfectly vertical line. By "vertical" is meant being perpendicular to the horizon, an upright position at right angles to perfectly horizontal surface. "Downwardly" means toward the earth or from a higher to a lower level toward the horizontally disposed plane.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A stripper frame assembly for a meat tenderizing machine comprising in combination an elongated horizontal blade guide being supported on each end by a movable column, said column contacting said blade guide at a substantially perpendicular manner, said movable column having said blade guide connected thereto at a lower portion and said movable column having a screw nut connected thereto at an upper portion, said screw nut having at least one slot therein having means to mate with and lock with a T-shaped safety bar, said safety bar having an aperture at each terminal portion of said bar and having a downwardly projecting tail that fits into locks and mates with said slot when said T-shaped safety bar is in a locked mode.

2. The stripper frame assembly of claim 1 wherein said T-shaped bar has at least two apertures.

3. The stripper frame assembly of claim 1 wherein said T-shaped bar has at least one tail.

4. The stripper frame assembly of claim 1 wherein said movable column is vertically positioned in said meat tenderizing machine.

5. The stripper frame assembly of claim 1 wherein said screw nut has at least one slot therein.

6. The stripper frame assembly of claim 1 wherein said tail is positioned substantially at the longitudinal midpoint of said bar.

7. The stripper frame assembly of claim 1 wherein said bar is substantially permanently secured to a support means to ensure non-movement to said bar and said screw nuts.

8. A stripper frame assembly used in a mechanical meat tenderizer, said stripper frame comprising in combination, means to support blades in a blade assembly, means to hold said blades in a separated structure, and an elongated horizontal blade guide, said blade guide supported on each end by a movable column, said column contacting said blade guide at a substantially perpendicular manner, said movable column having said blade guide connected thereto at a lower portion and said movable column having a screw nut connected thereto at an upper portion, said screw nut having a slot therein having means to mate with and lock with a T-shaped safety bar, said safety bar having an aperture at each terminal portion of said bar and having a downwardly projecting tail that fits into locks and mates with said slot when said T-shaped safety bar is in a locked mode.

9. The stripper frame assembly of claim 8 wherein said T-shaped bar has at least two apertures.

10. The stripper frame assembly of claim 8 wherein said T-shaped bar has at least one tail.

11. The stripper frame assembly of claim 8 wherein said movable column is vertically positioned in said meat tenderizing machine.

12. The stripper frame assembly of claim 8 wherein said screw nut has at least one slot therein.

13. The stripper frame assembly of claim 8 wherein said tail is positioned substantially at the midpoint along a length of said bar.

14. The stripper frame assembly of claim 8 wherein said bar is substantially permanently secured to a support means to ensure non-movement to said bar and said screw nuts.

\* \* \* \* \*